United States Patent
Trester et al.

(10) Patent No.: US 8,114,540 B2
(45) Date of Patent: Feb. 14, 2012

(54) BUSS BAR FOR BATTERIES

(75) Inventors: Dale B. Trester, Milwaukee, WI (US); Steven J. Wood, Shorewood, WI (US); Gary P. Houchin-Miller, Fox Point, WI (US)

(73) Assignee: Johnson Controls Technology, LLC, Wilmington, DE (US)

( * ) Notice: Subject to any disclaimer, the term of this patent is extended or adjusted under 35 U.S.C. 154(b) by 0 days.

(21) Appl. No.: 12/538,005

(22) Filed: Aug. 7, 2009

(65) Prior Publication Data

US 2010/0015519 A1 Jan. 21, 2010

Related U.S. Application Data

(63) Continuation of application No. PCT/US2008/053463, filed on Feb. 8, 2008.

(60) Provisional application No. 60/889,130, filed on Feb. 9, 2007, provisional application No. 60/960,348, filed on Sep. 26, 2007.

(51) Int. Cl.
*H01M 2/24* (2006.01)
*H02G 5/00* (2006.01)

(52) U.S. Cl. ........... 429/160; 174/68.2; 429/90; 429/93; 429/94; 429/121; 429/123

(58) Field of Classification Search ............... 429/90, 429/93, 94, 121, 123, 160; 174/68.2
See application file for complete search history.

(56) References Cited

U.S. PATENT DOCUMENTS

| 1,073,670 | A | 9/1913 | Ford |
| 1,373,241 | A | 3/1921 | Heberling et al. |
| 4,247,603 | A | 1/1981 | Leffingwell et al. |
| 4,430,395 | A | 2/1984 | Davis et al. |
| 4,678,727 | A | 7/1987 | Kawakami et al. |
| 5,017,859 | A * | 5/1991 | Engel et al. ................ 324/127 |
| 5,527,637 | A * | 6/1996 | Nakazawa et al. ............ 429/99 |
| 5,985,480 | A * | 11/1999 | Sato et al. .................. 429/65 |
| 6,097,173 | A * | 8/2000 | Bryant, Jr. ................ 320/107 |
| 6,152,776 | A * | 11/2000 | Ikeda et al. ................ 439/627 |
| 6,645,669 | B2 | 11/2003 | White et al. |
| 7,037,146 | B2 | 5/2006 | Nakamura |
| 2004/0140904 | A1* | 7/2004 | Bertness .................. 340/636.15 |
| 2004/0190294 | A1 | 9/2004 | Gasquet et al. |
| 2006/0127754 | A1 | 6/2006 | Hamada et al. |
| 2007/0099073 | A1* | 5/2007 | White et al. ................ 429/158 |

FOREIGN PATENT DOCUMENTS

EP 0986114 A1 3/2000

OTHER PUBLICATIONS

International Search Report and Written Opinion for International Application No. PCT/US2008/053463; date of mailing Jul. 14, 2008; 6 pages.
Supplementary European Search Report for European Application No. 08729428.6, date of completion Jun. 10, 2010, 6 pages.
Filed response for European Application No. 08729428.6, date of mailing Jan. 6, 2011, 11 pages.

* cited by examiner

*Primary Examiner* — Ula C. Ruddock
*Assistant Examiner* — Amanda Barrow
(74) *Attorney, Agent, or Firm* — Foley & Lardner LLP

(57) ABSTRACT

A buss bar for connecting electrochemical cells together includes a conductive member having a first end, a second end, and an elongated body between the first end and second end. The body includes a stress relief region configured to dampen vibrational forces received by the buss bar. The buss bar also includes a voltage sense terminal coupled to the conductive member.

16 Claims, 8 Drawing Sheets

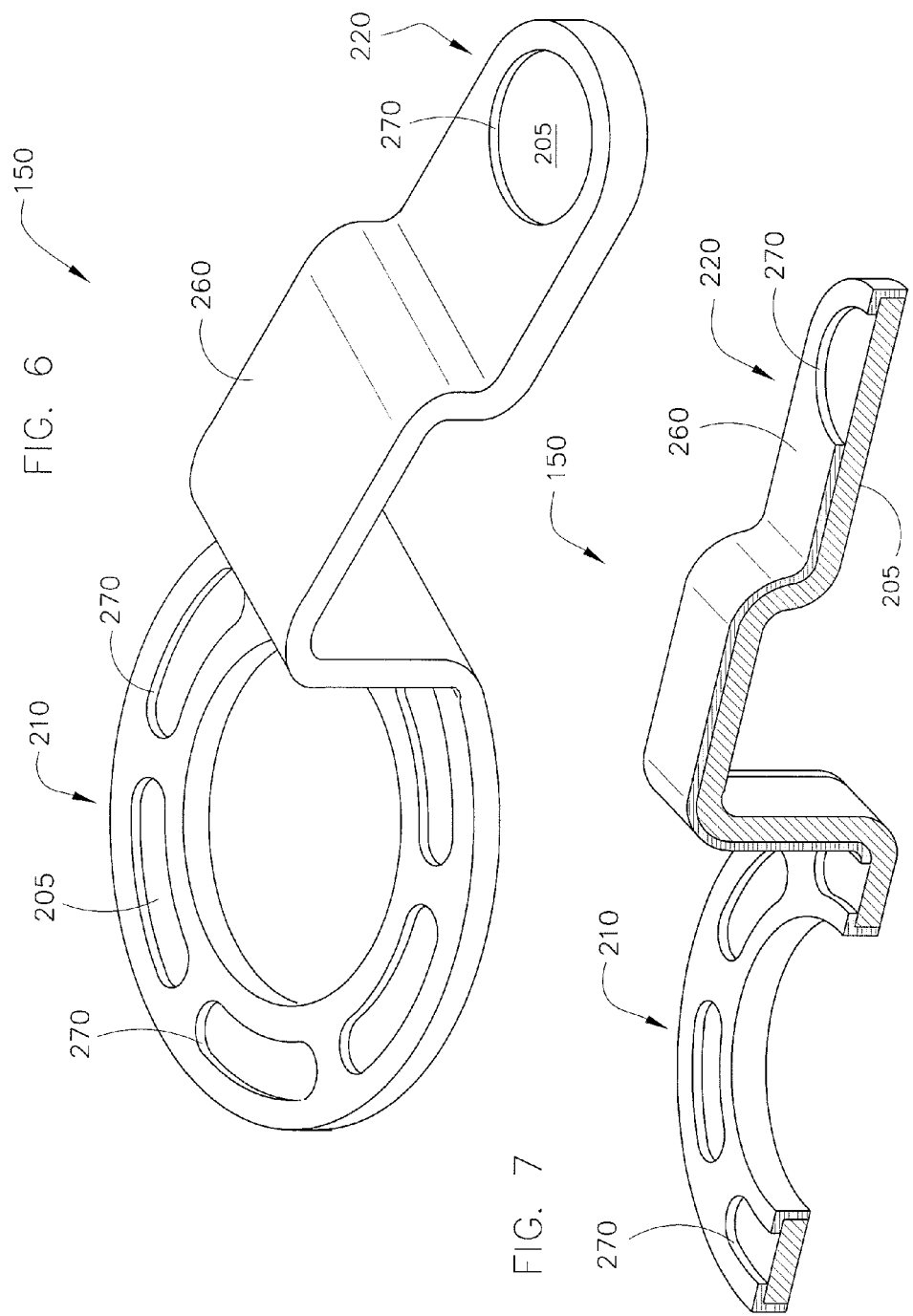

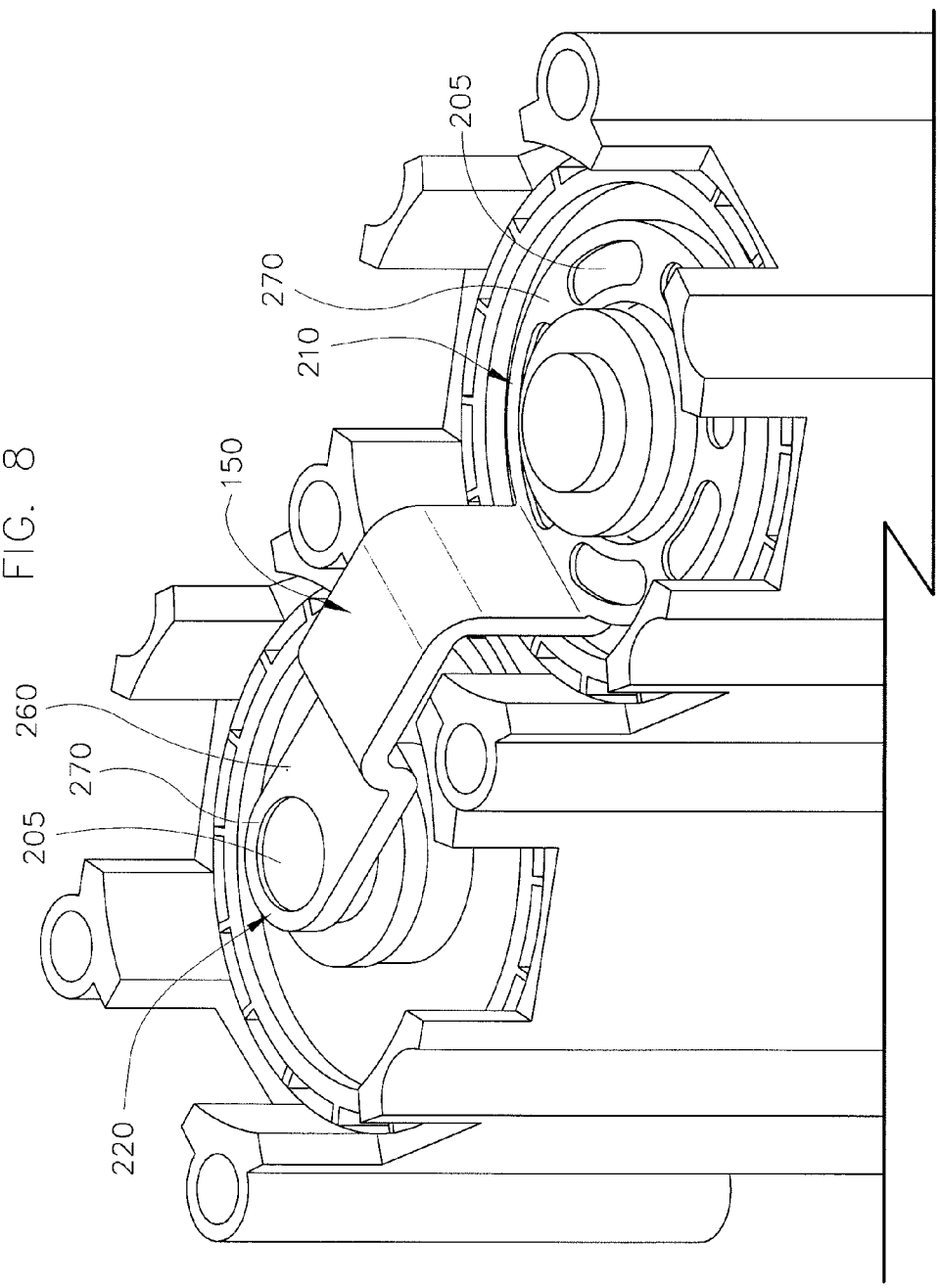

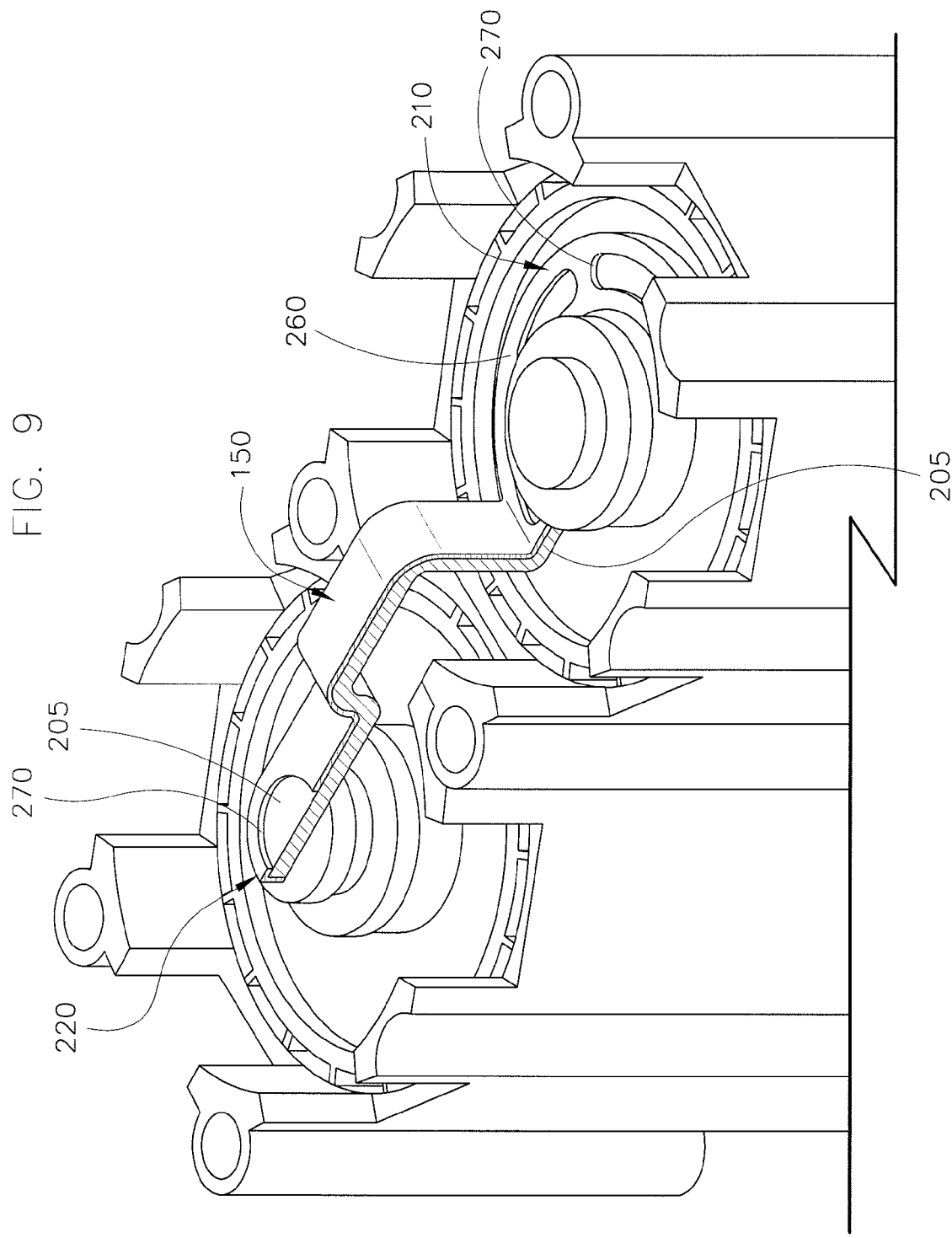

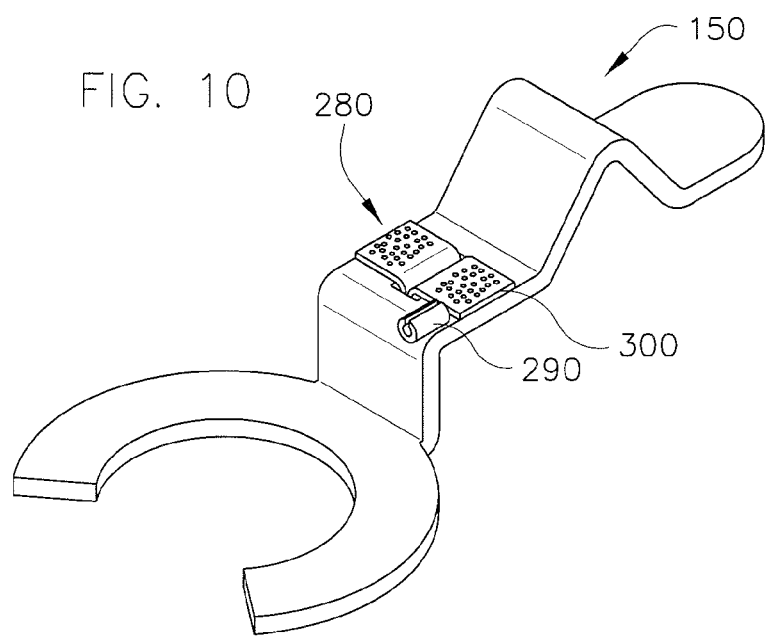
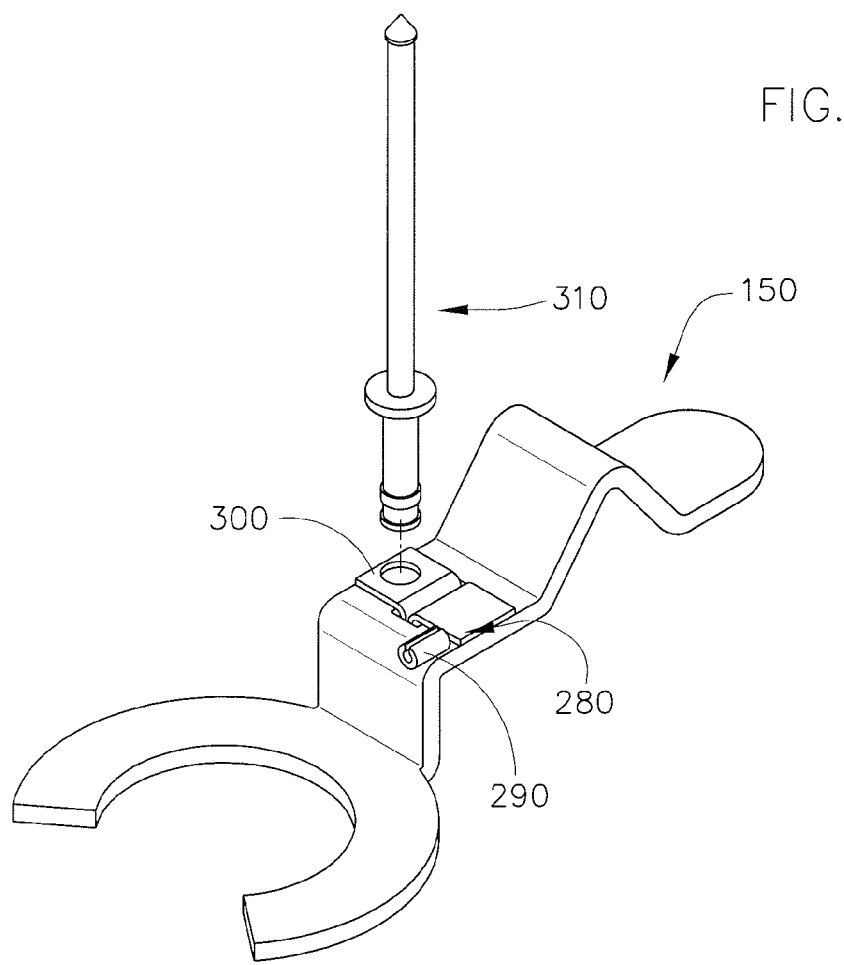

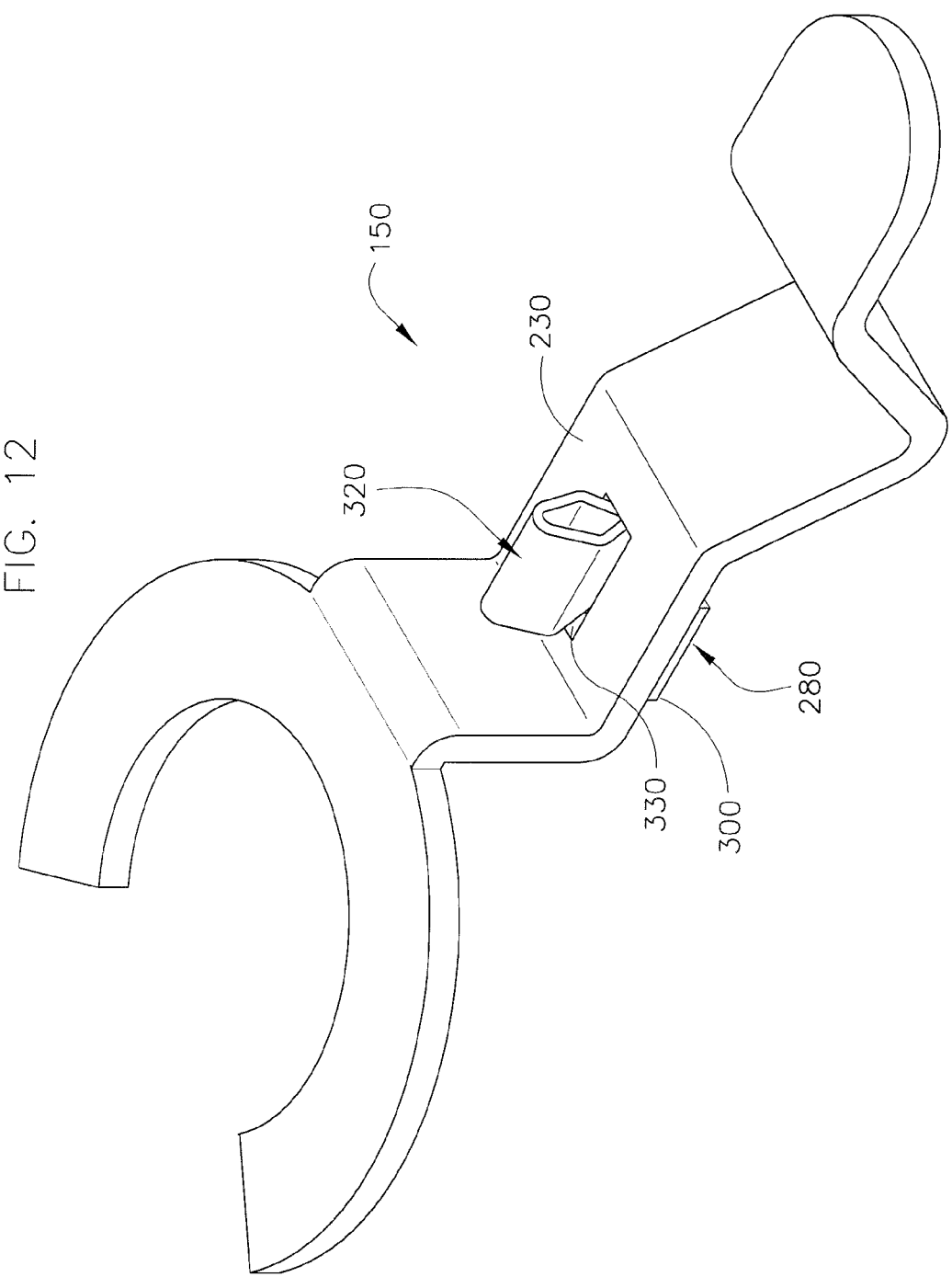

BUSS BAR FOR BATTERIES

CROSS-REFERENCE TO RELATED PATENT APPLICATIONS

This application is a Continuation of International Patent Application No. PCT/US2008/053463, filed Feb. 8, 2008, which claims the benefit of and priority to U.S. Provisional Patent Application No. 60/889,130, filed Feb. 9, 2007 and U.S. Provisional Patent Application No. 60/960,348, filed Sep. 26, 2007.

The disclosures of the following patent applications are incorporated by reference in their entirety: International Patent Application No. PCT/US2008/053463; U.S. Provisional Patent Application No. 60/889,130; and U.S. Provisional Patent Application No. 60/960,348.

BACKGROUND

The present application relates to battery systems and battery modules (e.g., for use in vehicles such as hybrid electric or electric vehicles) and more specifically, to a buss bar that helps manage and reduce stresses on battery or cell terminals within a battery module.

It is known to provide batteries for use in vehicles such as automobiles. For example, lead-acid batteries have been used in starting, lighting and ignition applications. More recently, hybrid vehicles have been produced which utilize a battery (e.g., a nickel-metal-hydride battery) in combination with other systems (e.g., an internal combustion engine) to provide power for the vehicle.

It is known that different hybrid vehicles have different power needs and may require different numbers of batteries to meet those power needs. It is also generally known to connect a number of batteries or cells using buss bars to form a battery module. A buss bar may, for example, connect a terminal on a first cell to a terminal on a second cell. The buss bar may be secured using a variety of methods, including mechanical fasteners (e.g., screws, etc.), welding (e.g., laser welding, etc.), and so on, often forming rigid connections between the terminals of various cells.

One problem associated with some buss bars is the stress applied to the battery system and battery module resulting from vibration and/or manufacturing tolerances and temperature changes. For example, a hybrid electric vehicle may use a battery module that includes a number of individual cells that are interconnected serially by buss bars. As the vehicle travels, vibratory forces on the cells are transmitted between cells via the buss bars, resulting in undesirable stresses being applied to the cell terminals and the interfaces between the terminals and the buss bars. Furthermore, the cell terminals may experience additional stresses due to imperfect manufacturing tolerances that result in variations in buss bar dimensions, cell dimensions, the distances between terminals, etc. Each of these stresses can deteriorate the connections between the terminals and buss bars.

Another problem associated with battery modules including buss bars is the possibility of the short circuit or shock between the high voltage circuit and the buss bars, especially when a battery is damaged due circumstances such as a vehicle crash. Yet another problem associated with battery modules including buss bars is the difficulty in measuring conditions such as voltage and temperature of cells.

Accordingly, it would be advantageous to provide a buss bar that has a portion or feature that is configured to better absorb, dampen, reduce, and/or eliminate the stresses on individual cells within a battery module.

Accordingly, it would also be advantageous to provide a buss bar that is substantially insulated or otherwise covered to at least partially electrically isolate the buss bars while providing access points for coupling the buss bars to the terminals.

It would also be advantageous to provide a buss bar including voltage sensing leads to monitor voltage conditions of cells for safety and effective operation.

SUMMARY

According to one embodiment, a buss bar for connecting electrochemical cells together includes a conductive member having a first end, a second end, and an elongated body between the first end and second end. The body includes a stress relief region configured to dampen vibrational forces received by the buss bar. The buss bar also includes a voltage sense terminal coupled to the conductive member.

According to another embodiment, a buss bar for connecting electrochemical cells together includes a conductive member having a first end, a second end, and an elongated body between the first end and second end. The body includes a stress relief region configured to allow the conductive member to flex so that the conductive member resists decoupling from connected electrochemical cells. The buss bar also includes a cover provided in contact with the conductive member to at least partially electrically insulate the buss bar.

According to another embodiment, a battery system that includes a stress-relieving buss bar includes a conductive member electrically coupled to a terminal of a first battery and a terminal of a second battery. The conductive member includes a stress relief feature configured to reduce the tendency of the conductive member to decouple from the terminals of the first battery and second battery. The battery system also includes a voltage sense terminal provided on the conductive member.

BRIEF DESCRIPTION OF THE DRAWINGS

FIG. 6 is an isometric view of a buss bar according to an exemplary embodiment.

FIG. 7 is an isometric cross-sectional view of the buss bar of FIG. 6.

FIG. 8 is a partial isometric view of a portion of the battery module including the buss bar of FIG. 6 connecting two cells according to an exemplary embodiment.

FIG. 9 is a partial isometric view of a portion of the battery module including a cross-sectional view of the buss bar of FIG. 8 according to an exemplary embodiment.

FIG. 10 is an isometric view of a buss bar according to an exemplary embodiment.

FIG. 11 is an isometric view of a buss bar and rivet apparatus according to an exemplary embodiment.

FIG. 12 is an isometric view of a buss bar according to an exemplary embodiment.

DETAILED DESCRIPTION

Figure 1:
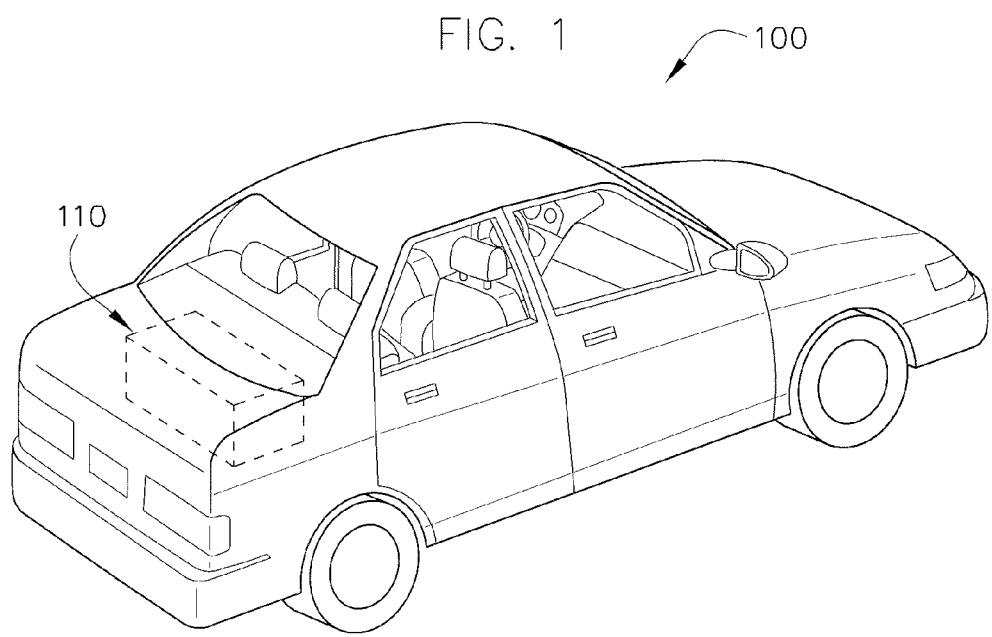
FIG. 1 is a perspective view of a vehicle having a battery module according to an exemplary embodiment.

Referring to FIG. 1, a vehicle 100 is shown according to an exemplary embodiment that includes a battery module 110. While vehicle 100 is shown as an automobile, according to various alternative embodiments, the vehicle may comprise a wide variety of differing types of vehicles including, among others, motorcycles, buses, recreational vehicles, boats, and the like. According to an exemplary embodiment, vehicle 100 is a hybrid electric or electric vehicle. Battery module 110 is configured to provide at least a portion of the power required to operate vehicle 100 and/or various vehicle systems. Further, it should be understood that according to various exemplary embodiments, the battery module may be utilized in a variety of applications not involving a vehicle, and all such applications are intended to be within the scope of the present disclosure.

Figure 2:
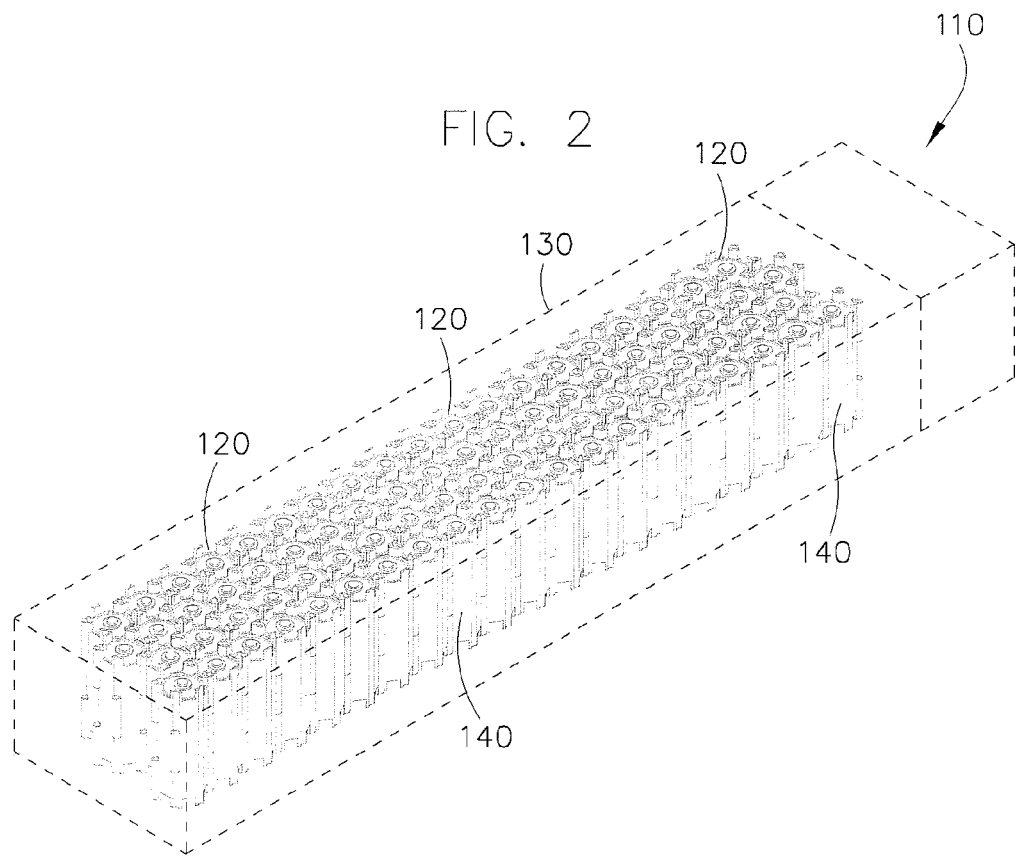
FIG. 2 is an isometric view of a portion of the battery module of FIG. 1 according to an exemplary embodiment.

Referring now to FIG. 2, a portion of battery module 110 is shown according to an exemplary embodiment that includes several batteries or cells 120 (e.g., lithium-ion cells, each of which includes one or more positive electrodes, one or more negative electrodes, separators between the electrodes, and any other features necessary to provide an operational battery or cell) that are held within a housing 130 and/or tray. As shown in FIG. 2, each cell 120 is generally cylindrical. However, according to various exemplary embodiments, the cells may be of any suitable configuration. The battery module may further include other components (e.g., a battery management system (BMS), etc.) that are electrically coupled to the cells. According to an exemplary embodiment, and although not shown in FIG. 2, the cells are coupled together using buss bars (see, e.g., FIG. 4).

While FIG. 2 shows an exemplary embodiment of a battery module, it should be understood that the battery module is not limited to any particular arrangement as will be appreciated by those reviewing this disclosure. For instance, while battery module 110 is shown with vertically-oriented cells 120 received in a series of interlocking sleeves 140 or tubes that are arranged in a group with four substantially parallel (and offset) rows of cells 120, it should be understood that the battery module may have many different configurations. For example, the cells may also be generally horizontal, be several separate groups, or arranged in other configurations. Furthermore, different numbers and types (e.g. nickel-metal-hydride, etc.) of cells may be used. The housing may include features (e.g., sidewalls, etc.) that are intended to receive and arrange the cells.

It should also be appreciated that the battery module may not include any sleeves. It should be understood that the concepts presented in this application are not limited to cylindrical cells and may be adapted to cells of various chemistries (e.g., nickel metal-hydride, lithium-ion, lithium-polymer, etc.), shapes (e.g., cylindrical, oval, rectangular, etc.), terminal styles (e.g., blade-type, threaded rod, etc.), terminal arrangements (e.g., two terminals located on opposite distal ends, two terminals located on the same end, etc.) and sizes.

Figure 3:
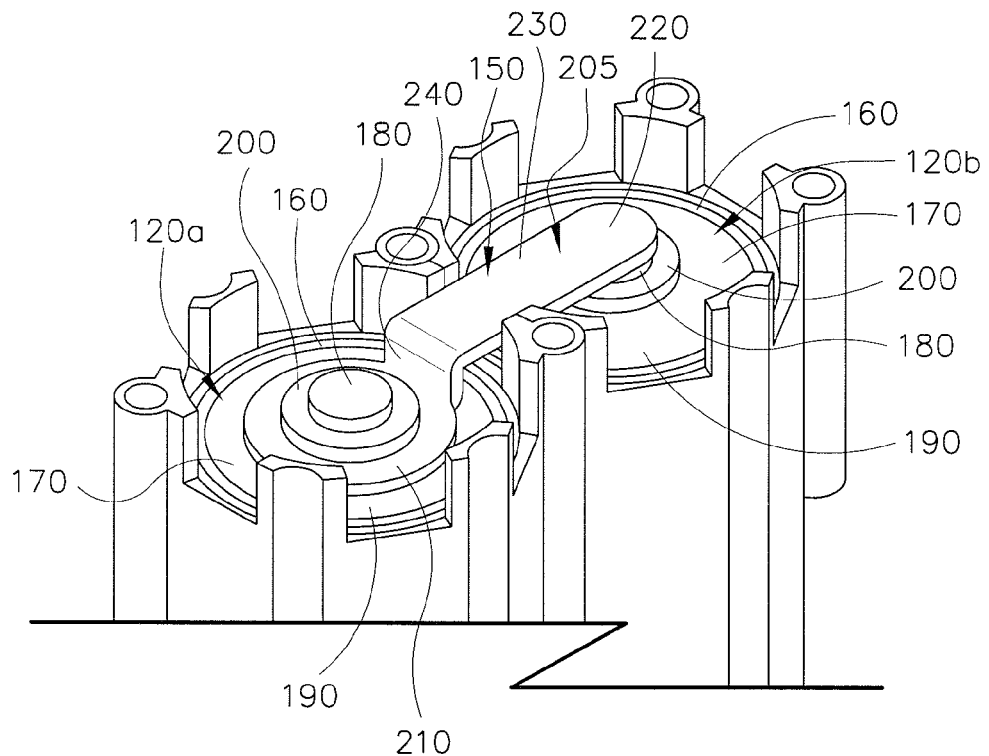
FIG. 3 is a partial isometric view of a portion of the battery module including a buss bar connecting two cells according to an exemplary embodiment.
Figure 4:
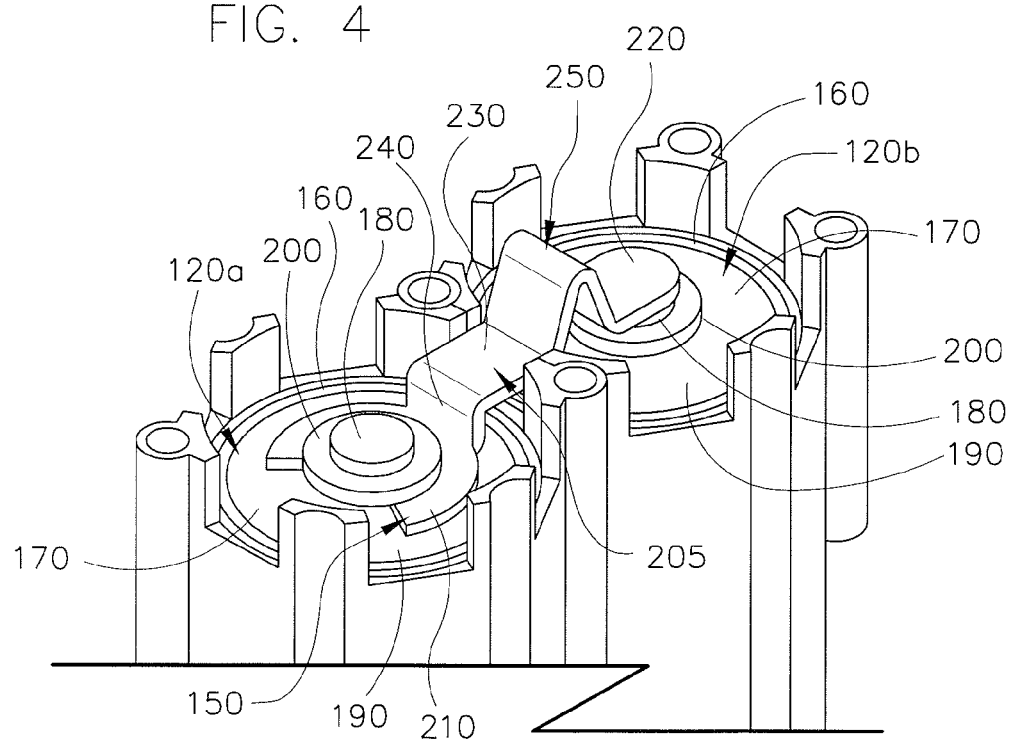
FIG. 4 is a partial isometric view of a portion of a battery module including a buss bar connecting two cells according to an exemplary embodiment.

FIGS. 3 and 4 show a portion of a battery module including a first cell 120a and a second cell 120b coupled together with a buss bar 150. According to various embodiments, first cell 120a and second cell 120b each include a body portion or can 160 having a lid or top face 170 and a first terminal 180 protruding from top face 170. Can 160 is configured to be utilized as a second terminal 190 and is insulated from first terminal 180 at least partially by a first insulator 200.

Each of the cells 120a/120b includes a wound element or electrode roll that may be coupled at one end to a negative collector which is coupled to first terminal 180 and at another end to a positive collector which is coupled to can 160. In various embodiments, the electrode may be coupled to the first terminal at one end and to the can at the other end. Electrode roll is at least partially insulated from the can by a second insulator.

In various embodiments, first terminal 180 is a negative terminal and second terminal 190 is a positive terminal. In other embodiments, however, the first terminal is a positive terminal and the second terminal is a negative terminal. In various embodiments, first terminal 180 is a generally cylindrical member that is positioned substantially on the central longitudinal axis of each cell 120a/120b. However, the first terminal may be of any suitable shape, configuration or position.

In various embodiments, buss bar 150 includes a conductive member 205. In various embodiments, conductive member 205 couples second terminal 190 of first cell 120a to first terminal 180 of second cell 120b. Conductive member 205 includes a first end 210, a second end 220 and a body 230 coupled to first end 210 and second end 220. In various embodiments, the first end 210 and second end 220 are oriented in substantially parallel planes. In various embodiments, and as shown in FIGS. 3 and 4, first end 210 is substantially coupled to second terminal 190 of first cell 120a (e.g. by welding) and second end 220 is substantially coupled to first terminal 180 of second cell 120b (e.g. by welding). In various exemplary embodiments, and as shown in FIGS. 3 and 4, conductive member 205 also includes a height adapter 240 to help improve the coupling of buss bar 150 to the terminals.

As shown in FIG. 4, according to an exemplary embodiment, one end of conductive member 205 (e.g., first end 210) may have a crescent or "C-shape." According to various other exemplary embodiments, each or both of the end(s) of the conductive member may take other shapes (e.g., annular, circular, oval, square etc.). As shown in FIG. 4, conductive member 205 has a relatively rectangular cross-sectional shape. As one of ordinary skill in the art will appreciate, however, the cross-section of the conductive member may be of any suitable shape and dimension.

The conductive member may be constructed in a number of ways. For example, the conductive member may be integrally formed (e.g., stamped, etc.). In various exemplary embodiments, the first end, the second end, the body, and any height adaptor may be coupled together by a process such as welding or a mechanical process. According to various exemplary embodiments, the conductive member is formed of a conductive material. For example, the conductive member may be constructed in part or in whole of copper, a copper alloy, or aluminum. In various embodiments, the conductive member may be constructed of substantially rigid material that is substantially uniform in composition.

Referring now to FIG. 4, a portion of a battery module is shown according to an exemplary embodiment that includes first cell 120a and second cell 120b coupled together with buss bar 150 which includes at least one stress relief region or arch feature 250 or element intended to reduce or relieve (e.g., absorb, etc.) stress so as to reduce decoupling of the buss bars and/or damage to the cells. According to an exemplary embodiment, buss bar 150 includes an arch feature 250 to help improve the flexure of buss bar 150. Arch feature 250 is provided between the first end 210 and second end 220. The arch feature 250 helps provide a dampening feature that is intended to absorb and/or dampen any forces applied to the welded connection between the buss bar and the cells during vibration of the battery module or as a result of imperfect manufacturing tolerances. As one of ordinary skill in the art will appreciate, arch feature 250 may also be configured to position the first end and second end of the buss bar 150 to reduce or otherwise eliminate any need for height adapter 240.

More specifically, and as shown in FIG. 4, in one exemplary embodiment, arch feature 250 includes an inverted "V" shape that permits buss bar 150 to deform (e.g., bend, flex, expand and contract in length, etc.) in response to vibratory and other forces transmitted to and/or between the cells. For example, if the cells shown in FIG. 4 were to vibrate relative to each other, the distance between the terminals of the two cells (i.e., the terminals coupled by the buss bar) may vary as the individual cells move relative to each other. Unlike a more rigid buss bar, which would tend to transfer stresses to the terminals under such conditions, buss bar 250 shown in FIG. 4 is intended to absorb some or all of the vibrational forces resulting from the movement of the individual cells by bending, deforming, expanding/contracting in length, etc. (e.g., by way of the bent portion flexing or deforming to provide an overall longer/shorter length or different shape for the buss bar).

Figure 5:
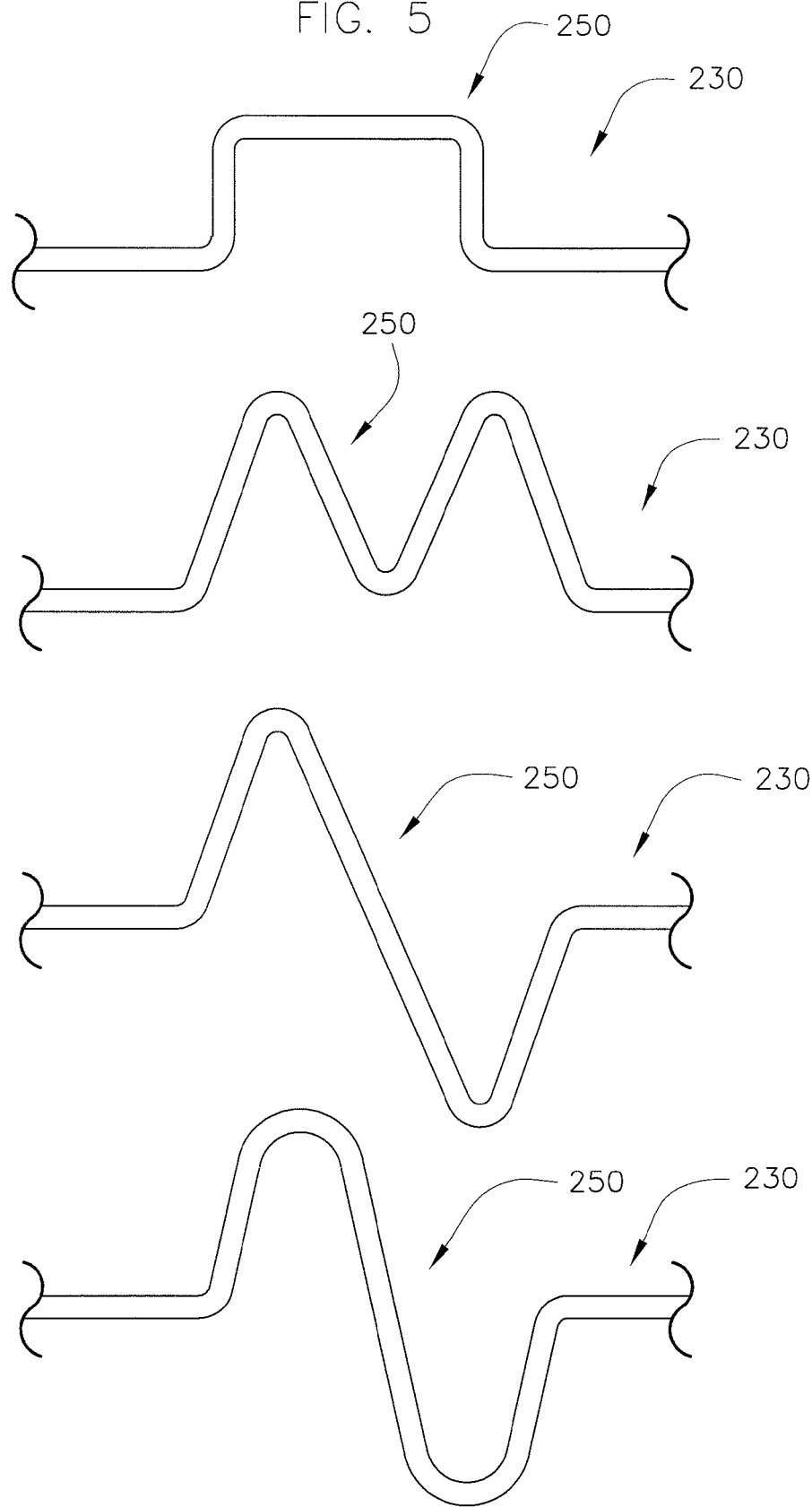
FIG. 5 illustrates various configurations of a portion of a body of a buss bar according to various exemplary embodiments.

Referring to FIG. 5, according to various other exemplary embodiments, the body 230 or buss bar 150 may include a wide variety of arch feature 250 shapes and/or configurations intended to dampen or absorb stresses applied to and/or between the cell terminals. For example, as shown in FIG. 5, arch feature 250 may include one or more U-shaped or C-shaped members, multiple "V-," "U-," or "C-" shaped bends, or one or more "V-," "U-," or "C-" shaped bends that are oriented 180 degrees with respect to each other. Furthermore, arch feature 250 may include one or more curves (e.g., an "S" shape, partial "S" shape, etc.).

According to various other exemplary embodiments, the cross-section of the body of the conductive member or more specifically, the arch feature of the buss bar may be varied relative to the other portions of the buss bar to enhance the stress-reducing characteristics of the buss bar while maintaining the current-carrying capacity of the buss bar. For example, the cross-section of the conductive member may be reduced (e.g., by reducing the material thickness) through at least a portion of the arch feature. Furthermore, alternate materials that provide enhanced elasticity while maintaining the conductivity of the buss bar may be utilized or otherwise included in the arch feature or body.

While not illustrated in the FIGS. 3 and 4, it should be understood that, in various exemplary embodiments, additional buss bars are utilized in the battery module. For example, in many exemplary embodiments, additional buss bars are utilized to couple the cells shown to other cells (not shown) and/or battery module terminals (not shown) or other current collectors (not shown). In many exemplary embodiments, the buss bars are utilized to couple other cells (not shown) to other cells (not shown) and/or battery module terminals (not shown) or other current collectors (not shown).

[Referring now to FIGS. 6 through 9, another exemplary embodiment of buss bar 150 is illustrated. In various embodiments, buss bar 150 may also include a cover 260 that substantially envelops at least margins and/or a face of conductive member 205. Cover 260 is intended to provide additional electrical insulation between the buss bars, terminals and other conductive elements to help prevent short circuits and/or shocks under certain circumstances (e.g., in the event of a crash or other damage to a battery module).

In various exemplary embodiments, cover 260 may define one or more apertures 270 near first end 210 and second end 200 of buss bar 150. In various embodiments, apertures 270 allow access to portions of conductive member 205 included in buss bar 150 so that first end 210 and/or second end 220 may be more easily coupled (e.g., welded) to the terminals of battery cells.

In various exemplary embodiments, cover 260 is constructed of non-conductive material. For example, the cover may be constructed of low cost insulators such as polypropylene, polyethylene, or polybutylene terephthalate. The cover may be coupled or otherwise operatively connected to the conductive member of the buss bar in any number of ways. For example, in various embodiments, cover 260 is snapped on conductive member 205 of buss bar 150.

Referring now to FIGS. 10 through 12, in various embodiments, a voltage sense terminal 280 is operative connected or otherwise coupled to buss bar 150. In various embodiments, voltage sense terminal 280 includes a wire crimp 290. As shown in FIGS. 10 through 11, voltage sense terminal 280 includes at least one flange 300 that may be utilized in coupling voltage sense terminal 280 to buss bar 150. However, in various embodiments, the voltage sense terminal may include any number of other types of suitable members or apparatus that may be utilized to couple or otherwise operatively connect the voltage sense terminal to the buss bar.

The voltage sense terminal may be coupled to the buss bar in any number of ways. For example, as shown in FIG. 10, voltage sense terminal 280 may be welded (e.g., laser welded) to buss bar 150. As shown in FIG. 11, voltage sense terminal 280 may be riveted to buss bar 150 utilizing a rivet apparatus 310. As shown in FIG. 12, voltage sense terminal 280 may include a spring-type apparatus or flexible bulge 320 configured to pass through an aperture 330 defined by body 230 of buss bar 150. In various exemplary embodiments, flexible bulge 320 helps maintain the position of voltage sense terminal 280 relative to buss bar 150. Importantly, in various embodiments (such as the buss bar including an insulated cover), flexible bulge 320 helps couple voltage sense terminal 280 to the conductive member or material of the buss bar.

In various embodiments, the voltage sense terminal is coupled to a controller (CSC) and/or controller circuit board (PCB). The controller and/or controller circuit board may be used to measure or otherwise control voltage, as well as other aspects such as current and/or temperature.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is important to note that the construction and arrangement of the elements of the system as shown and described in the preferred and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements and/or elements shown as multiple parts may be integrally formed, the operation of interfaces may be reversed or otherwise varied, the length and/or width of the structures and/or members or connections or other elements of the system may be varied, the nature or number of adjustment positions provided between the elements may be varied, the position of elements may be reversed or otherwise varied, and the nature or number of discrete elements or positions may be altered or varied. It should be noted that the elements and/or assemblies of the system may be constructed from any of a wide variety of materials that provide sufficient strength or durability, in any of a wide variety of colors, textures and combinations. Accordingly, all such modifications are intended to be included within the scope of the present invention. Other substitutions, modifications, changes and omissions may be made in the design, operating conditions and arrangement of the preferred and other exemplary embodiments without departing from the scope of the present inventions.

What is claimed is:

1. A buss bar for connecting electrochemical cells together comprising:
    a conductive member having a first end configured to be coupled to a terminal of a first electrochemical cell, a second end configured to be coupled to a terminal of a second electrochemical cell, and an elongated body between the first end and second end, the body comprising a stress relief region configured to dampen vibrational forces received by the buss bar; and
    a voltage sense terminal separate from the terminals of the first and second electrochemical cells coupled to the conductive member, wherein a portion of the voltage sense terminal extends through an aperture defined by the elongated body of the conductive member.

2. The buss bar of claim 1, further comprising a cover coupled to the conductive member to at least partially electrically insulate the buss bar.

3. The buss bar of claim 2, wherein the cover substantially envelops edges of the conductive member and at least a portion of a face of the conductive member.

4. The buss bar of claim 3, wherein the cover comprises a first end and a second end and defines at least one aperture on each of the first end and second end.

5. The buss bar of claim 1, wherein the stress relief region comprises a reduced cross-section in relation to a cross-section of the body.

6. The buss bar of claim 1, wherein the stress relief region comprises an arch feature configured to help improve the flexibility of the buss bar.

7. The buss bar of claim 6, wherein the arch feature is at least one of at least partially V-shaped, at least partially U-shaped, and at least partially C-shaped.

8. The buss bar of claim 1, wherein the conductive member is constructed of a substantially rigid material of substantially uniform composition.

9. The buss bar of claim 1, wherein the voltage sense terminal includes a wire crimp and is coupled to the conductive member by at least one of a riveting and a welding operation.

10. The buss bar of claim 1, wherein the voltage sense terminal comprises a flexible bulge received by the aperture defined by the body of the conductive member in order to couple the voltage sense terminal to the conductive member.

11. The buss bar of claim 1, wherein the first end of the conductive member has a substantially circular shape and comprises an aperture configured to receive the terminal of the first electrochemical cell therethrough, wherein the aperture is generally concentric with the circular shape of the first end.

12. The buss bar of claim 6, wherein the arch feature comprises a first portion at a height above the body and a second portion at a height below the body.

13. The buss bar of claim 6, further comprising a cover coupled to the conductive member, the cover substantially conforming to the arch feature of the stress relief region.

14. The buss bar of claim 1, wherein the voltage sense terminal is configured to be coupled to the body by laser welding.

15. The buss bar of claim 1, wherein the voltage sense terminal is configured to be coupled to the body by a rivet apparatus.

16. The buss bar of claim 1, wherein the aperture defined by the elongated body is located essentially between the first end and the second end of the conductive member.

* * * * *